PHENOL BY AIR OXIDATION OF CRESOLS

Johnstone S. Mackay and Frank J. Vancheri, Pittsburgh, Pa., assignors to Pittsburgh Chemical Company, Pittsburgh, Pa., a corporation of Pennsylvania
No Drawing. Filed May 2, 1960, Ser. No. 25,834
6 Claims. (Cl. 260—621)

The present invention relates to the oxidation of ortho cresol to form phenol and sodium phenate. While m- and p-cresol are frequently in short supply, there is frequently more o-cresol available that there is demand.

It is an object of the present invention to obtain phenol directly from o-cresol and thereby upgrade the o-cresol.

Another object is to obtain phenol from o-cresol in improved yields.

A further object is to convert o-cresol to phenol while reducing the by-product formation.

An additional object is to develop an improved process for forming sodium phenate.

Still further objects and the entire scope of applicability of the present invention will become apparent from the detailed description given hereinafter; it should be understood, however, that the detailed description and specific examples while indicating preferred embodiments of the invention, are given by way of illustration only, since various changes and modifications within the spirit and scope of the invention will become apparent to those skilled in the art from this detailed description.

It has now been found that these objects can be attained by the air oxidation of sodium o-cresylate in the presence of excess sodium hydroxide. The mol ratio of sodium hydroxide to o-cresol can be from 2:1 to 10:1 or higher e.g. 12:1. The preferred ratio is at least 6:1 with 10:1 being most preferred.

The time of reaction is critical with times of less than 3 hours the yield of the desired phenol are undesirably low. Additionally, the selectivity of phenol in the product is generally poorer with reaction times under three hours. Above seven hours the yield of phenol goes down undesirably. Additionally, polymeric by products are formed which have little utility and hence render the process inefficient. On the contrary, the by products formed at reaction times of 3 to 5 hours for the most part are quite useful and can be recovered. The preferred reaction time is 4 to 5 hours. There is a 100% conversion of o-cresol in 4 to 5 hours. Under the preferred time conditions, 50% or slightly more of the o-cresol is converted to phenol.

The temperature of the reaction can be from 300 to 450° C. with 335 to 375° C. giving the better results. The preferred temperature range is 335 to 360° C. The rate of air flow is not especially critical. Constant flow rates within the range of 100 ml./min. to 2400 ml./min. were utilized successfully for passage through mixtures of o-cresol and sodium hydroxide totaling about 100 grams in a vessel of 250 cc. capacity. Preferably, the flow rate is at least 1000 ml./min. to avoid slow-down of the reaction.

In place of feeding air through the mixture of sodium hydroxide and the o-cresol a mixture of air and the cresol can be fed into a vessel containing molten sodium hydroxide at the desired reaction temperature.

In the following examples, the reaction was carried out in a 250 cc. stainless steel bomb having a nickel liner. The bomb was provided with an air inlet and outlet and a thermocouple for recording the temperature. The cresol and sodium hydroxide flakes were charged into the liner and the bomb placed in an electrical resistance heater and the reaction mixture brought up to the reaction temperature in approximately one hour. Neutralization occurred during the heat-up period and the water distilled out. When the desired reaction temperature was reached, air was metered into the melt at the desired rates. The air feed was bubbled in beneath the surface of the melt (with low mol ratios of sodium hydroxide to cresol the reaction mixture was extremely thick at two hours but with a 10:1 ratio this undesired thickness was avoided). At the end of the run the fluid melt was poured hot from the liner into a beaker. The product solidified on cooling and was dissolved in 200–300 cc. of water. The alkaline solution was sprung with excess 50% sulfuric acid. (In place of sulfuric acid other acids stronger than phenol can be used, e.g. hydrochloric acid). The organic layer was extracted with three 100 cc. portions of ether. The combined ether extracts were dried and the ether removed by distillation. The selectivity for the formation of the phenol was determined on the basis of the cresol consumed according to the equation:

$$\text{Percent selectivity} \frac{\text{mols phenol formed}}{\text{mols o-cresol consumed}} \times 100$$

Unless otherwise indicated, all proportions are by weight.

| Example | Time, Hr. | Temp., °C | Total Air (l) | o-cresol, g. | NaOH, g. | Phenol g. | Conversion Percent | Phenol Mole Percent Yield | Percent Selectivity |
|---|---|---|---|---|---|---|---|---|---|
| 1 | 2.0 | 335 | 144 | 21.6 | 80.0 | 5.3 | 70.9 | 28.2 | 38.0 |
| 2 | 3.0 | 335 | 216 | 21.6 | 80.0 | 7.8 | 83.5 | 41.5 | 49.8 |
| 3 | 4.0 | 335 | 280 | 21.6 | 80.0 | 9.4 | 100 | 50.0 | 50.0 |
| 4 | 5.0 | 335 | 360 | 21.6 | 80.0 | 9.7 | 100 | 51.7 | 51.7 |
| 5 | 6.0 | 335 | 432 | 21.6 | 80.0 | 8.9 | 100 | 47.4 | 47.4 |
| 6 | 7.0 | 335 | 540 | 21.6 | 80.0 | 7.8 | 100 | 41.4 | 41.4 |
| 7 | 4.0 | 330 | 576 | 27.0 | 60.0 | 6.0 | 89.0 | 25.6 | 28.7 |
| 8 | 3.5 | 360 | 63 | 54.0 | 45.0 | 7.1 | 74.5 | 15.2 | 20.2 |
| 9 | 2.0 | 375 | 24 | 54.0 | 45.0 | 4.2 | 31.1 | 9.0 | 28.7 |
| 10 | 3.5 | 375 | 45 | 54.0 | 45.0 | 8.8 | 44.8 | 18.8 | 41.6 |
| 11 | 3.5 | 400 | 21 | 54.0 | 45.0 | 6.9 | 32.6 | 14.8 | 45.2 |
| 12 | 1.5 | 400 | 27 | 54.0 | 45.0 | 5.3 | 47.3 | 11.4 | 25.1 |

Examples 1–6 were carried out under identical conditions except for reaction times. It can be seen that not only is the overall conversion of o-cresol in Examples 2–6 superior to that of Example 1 but also the phenol yield and selectivity for phenol in the product are improved. A comparison of Example 7 (NaOH to cresol mol ratio 6:1) with Example 4 (NaOH to cresol mol ratio 10:1) shows that superior results are obtained with the higher mol ratio of sodium hydroxide to cresol even though the air flow rate was 2400 ml./min. in Example 7 and only 1200 ml./min. in Example 4. A comparison of Example 9 with Example 10 again shows the superiority for the longer reaction time both in percent conversion of the cresol, percent yield of phenol and percent selectivity for phenol. This is also illustrated by comparing Examples 11 and 12. The percent conversion in Examples 8, 10 and 11 are lower than in Example 2 due to the much lower air flow rates in Examples 8, 10 and 11 (rates of 100 to 300 ml./min. as against 1200 ml./min. for Example 2).

We claim:

1. A process of preparing sodium phenate comprising heating a mixture consisting essentially of o-cresol with at least 2 mols of sodium hydroxide per mol of o-cresol at a temperature of 300 to 450° C. for 3 to 7 hours while passing air therethrough.

2. A process according to claim 1 wherein the time is 4 to 5 hours.

3. A process according to claim 2 wherein the mol ratio of sodium hydroxide to o-cresol is from 6:1 to 10:1.

4. A process according to claim 1 wherein the temperature is 335 to 375° C. and the time is 4 to 5 hours.

5. A process according to claim 4 wherein the temperature is 360 to 375° C.

6. A process according to claim 1 wherein the time is 4 to 5 hours, the temperature is 335 to 375° C. and the sodium phenate is neutralized with a strong acid to form a phenol.

References Cited in the file of this patent
UNITED STATES PATENTS

| | | |
|---|---|---|
| 2,003,941 | Kahl | June 4, 1935 |
| 2,393,699 | Molinari | Jan. 29, 1946 |